May 11, 1965 B. LONG 3,183,072
PROCESS AND APPARATUS FOR MAKING SHEET GLASS
Filed Jan. 6, 1961 2 Sheets-Sheet 1
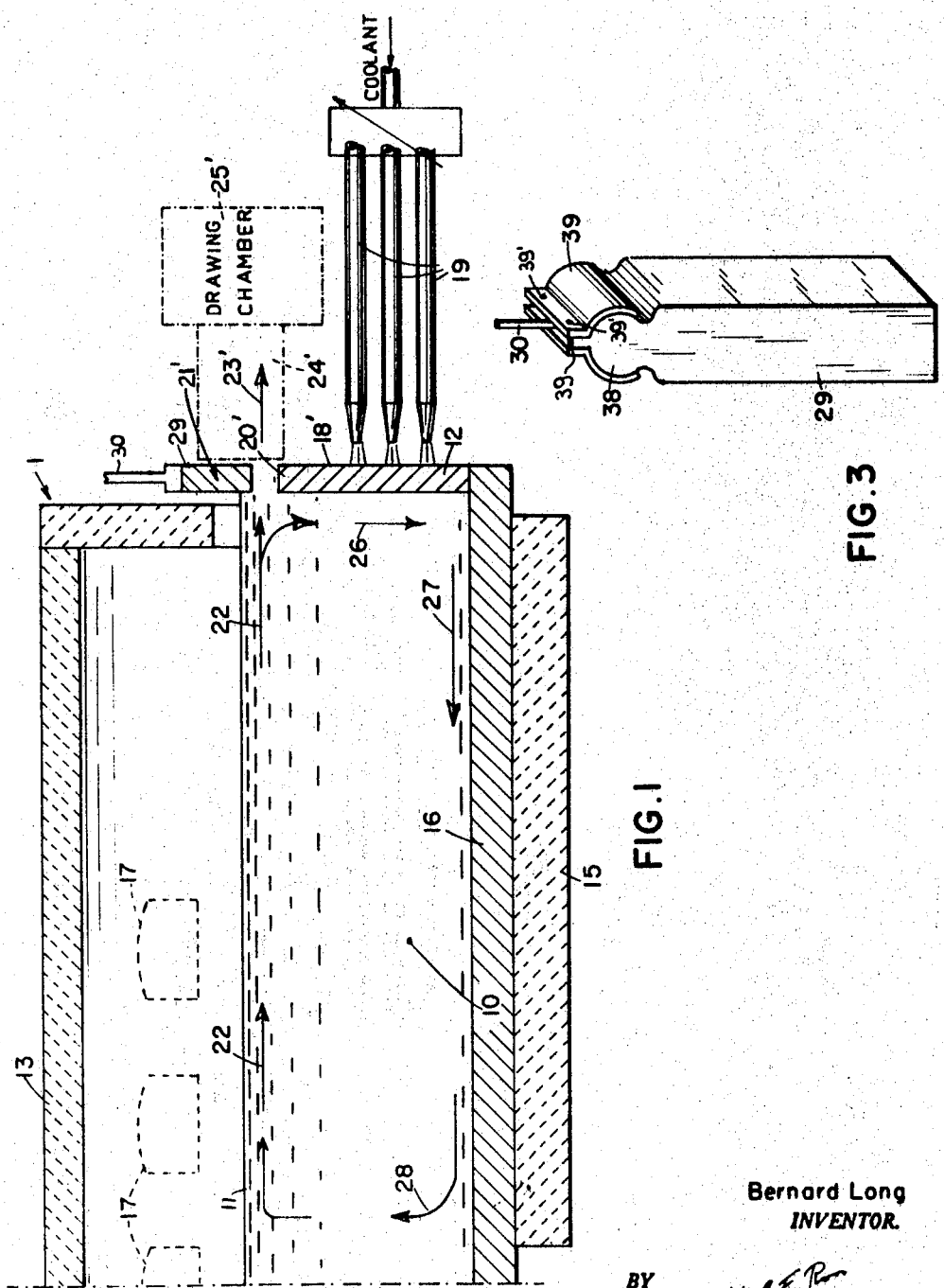
Bernard Long
INVENTOR.
BY
AGENT.

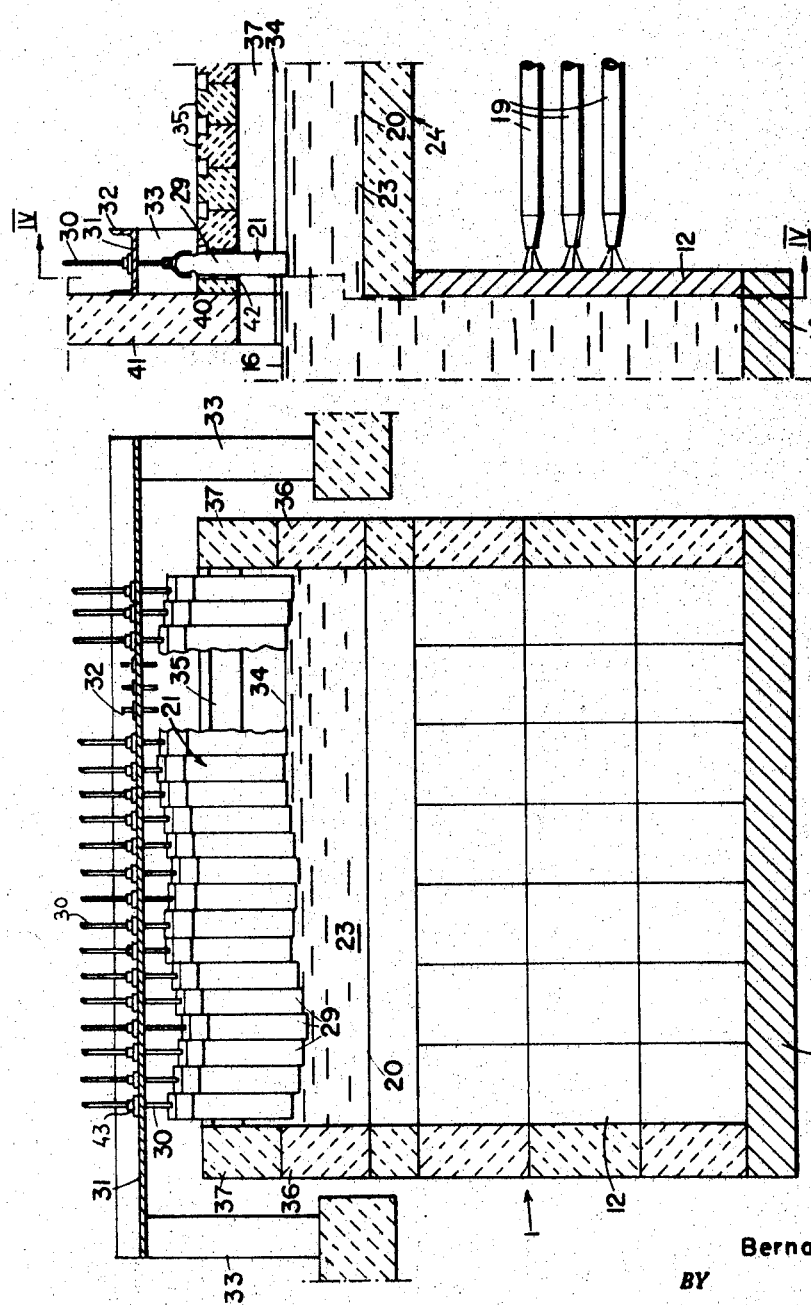

3,183,072
PROCESS AND APPARATUS FOR MAKING SHEET GLASS
Bernard Long, Paris, France, assignor to G.B.D. societe anonyme Holding, Luxembourg, Luxembourg, a corporation of Luxembourg
Filed Jan. 6, 1961, Ser. No. 81,049
Claims priority, application France, Jan. 26, 1960, 816,869 and Apr. 28, 1960, 825,640, Patent 1,255,483
3 Claims. (Cl. 65—333)

My present invention relates to a process and an apparatus for making sheet glass.

In conventional glass-sheet-fabricating processes a continuous band of progressively solidifying glass is drawn from a free surface of a molten-glass bath in a drawing chamber. Such processes include the method of vertically drawing the glass band from the melt (e.g. the so-called "Libbey-Owens" process, the so-called "Pittsburgh Plate Glass" processes and their variants).

It is the principal object of the present invention to provide an apparatus and a process adapted to accelerate the above and other sheet-glass-drawing processes, such as those disclosed in my co-pending applications Ser. Nos. 793,442 (now U.S. Patent No. 3,000,142 issued September 19, 1961) and 12,635 (now U.S. Patent No. 3,127,261 issued March 31, 1964) filed February 16, 1959, and March 3, 1960, respectively, whereby each furnace designed to carry out these processes may have a daily output which is substantially constant and may be between 100 and 180 tons.

In the above and other types of glass-drawing systems the drawing chamber is located downstream from the fusion and refining portions of an elongated tank furnace. Thus, from the raw-material inlet at an extremity of the furnace, the glass passes continuously through the fusion and refining portions of the tank before it emerges therefrom as a continuous flow and enters successively the connecting channel and the drawing chamber. Since the liquid glass admitted to the drawing chamber should possess the thermal characteristics, at its free surfaces and within the liquid mass, which make it possible to draw a continuous band from the melt within the drawing chamber, the temperature of the liquid mass in the channel is cooled in a controlled manner, e.g. as described in my above-identified copending applications which disclose cooling processes resulting in a negative temperature gradient in excess of 100° C. per meter along the upper surface of the glass melt from the inlet of the connecting channel to the inlet of the drawing chamber.

Only a portion of the liquid-glass current traversing the upper portion of the tank furnace to feed the connecting channel and the drawing chamber actually enters the channel while the remainder is deflected from this current and returned to the high-temperature region of the bath along the floor of the furnace in a return or back current. The velocity of the liquid-glass current supplying the connecting channel, which determines the flow velocity of the liquid glass in the drawing chamber and, consequently, the rate of sheet-glass production, is reduced progressively along the length of its path on account of the loss of heat from the current and the resulting increase in the viscosity of the liquid constituting it. A sufficient indication of the velocity of the supply current may be obtained from a visual observation of floats or bobs, immersed a few centimeters below the upper surface of the bath, whose displacement is proportional to the supply current. In conventional furnaces the floats have their maximum velocity (between 15 and 20 meters per hour) along the longitudinal axis of the tank furnace in the vicinity of the high-temperature refining zone and a much lower velocity (about 3 to 4 meters per hour) at the inlet to the connecting channel.

I have discovered that the production rate of glass sheet obtained from the drawing chamber bears a definite relationship with the quantity of glass supplied to the latter by the glass current, which traverses the upper portion of the bath in the tank furnace, and may be gauged by observation of the floats at the inlet to the chamber. Henceforth, therefore, the expression "supply-current velocity" is used to denote the speed of the current as indicated by such floats immersed to a depth of a few centimeters in the liquid glass of the current.

I have found, according to a feature of the present invention, that it is possible to accelerate the supply-current velocity and thus the production rate of the drawing chamber by cooling a deflected portion of that current which is subsequently returned thereto in a convection flow. By the normal laws of convection currents, the deflected or return current rises to join the source of the supply current, which coincides with the highest-temperature region ("hot point" or "hot spot") of the tank furnace. The hot-point temperature is easily maintained at a constant level generally between 1450° and 1500° C. The speed of the deflected portion, which is directed downwardly toward the floor of the tank furnace, is increased by cooling the deflector, advantageously a terminal wall of the tank furnace extending transversely to the supply current. Such cooling, whose intensity is, of course, dependent on the temperature of the hot point, increases the speed of the longitudinal current of liquid glass in the upper portion of the tank furnace; this current which supplies the connecting channel and the drawing chamber has a velocity which may reach 10 meters/hour at the inlet of the channel.

According to a more specific feature of the invention, the depth or thickness of the liquid-glass current fed to the connecting channel is regulated throughout the width of the current in order to compensate for irregularities in the thickness of the finished sheet.

For carrying out the process of the invention, I prefer to use a tank furnace whose depth is between substantially 120 and 150 centimeters and whose terminal wall, at the inlet to the connecting channel, is disposed at a distance less than 15 meters from the hot point of the furnace. The terminal wall is formed, at its upper surface, with a sill extending transversely of the supply current about 30 centimeters below the surface of the glass current passing thereover into the channel to prevent the development of a return flow of molten glass along the floor of the channel back into the furnace. A variable register or depth-control device is advantageously positioned above the sill to regulate the depth of the current entering the feeding channel. The register is formed, according to a still more specific feature of the invention, from an array of independently displaceable contiguous dampers which extend transversely of the supply current across the inlet to the channel.

It has been possible, by utilizing the process and apparatus of the invention, to achieve a supply-current velocity at the inlet to the channel ranging between 12 and 25 meters per hour. Such flow rates were realized with tank furnaces having a depth of 150 centimeters whose terminal walls at the inlet to the channels were disposed about 10 to 15 meters from the hot points of their respective furnaces. With the conventional Libbey-Owens type of drawing chamber, this supply-current velocity resulted in an increase in the sheet-glass-production rate of 50 to 100%. The temperature of the glass current at the sill was approximately 1250° to 1350° C. For the purpose of comparison it should be noted that a Libbey-Owens type of tank furnace has its terminal wall spaced about 27 meters from the hot point and supplies a fluid-glass mass advancing at the aforementioned rate of about 3 to 4 meters per hour to the drawing chamber.

The regulated cooling of the downwardly deflected portion of the supply current in contact with the terminal wall of the furnace increases the hydrostatic pressure measured at the foot of the descending column of glass adjacent this wall. The difference between the hydrostatic pressure at the foot of the descending column of glass and the hydrostatic pressure at the foot of the ascending column of glass at the hot point of the bath is the main factor on which depends the velocity of the supply current entering the channel. I have found that, by regularly cooling this descending column and so maintaining the substantially high difference in hydrostatic pressure between the two columns, a high rate of production may be obtained. The supply-current velocity is also influenced by the speed of the deflected or return current traversing the tank furnace from the aforementioned terminal wall to the hot point of the furnace along the horizontal floor thereof. This return current is, of course, slowed by its frictional contact with that floor.

I prefer, therefore, to form the floor of the furnace with a relatively thick heat-insulating material adapted to restrict the loss of heat from the horizontal part of the return current of glass. By so limiting the cooling of this current, I prevent a substantial increase in the viscosity of the glass stream, as mentioned above, together with a consequent reduction in speed thereof, while suppressing the tendency toward increased frictional resistance owing to the modification of the viscosity of the stream.

The above and other objects, features and advantages of the invention will become more rapidly apparent from the following description, reference being made to the accompanying drawing in which:

FIG. 1 is a longitudinal cross-sectional view of a tank furnace diagrammatically illustrating the process of the invention;

FIG. 2 is a view similar to FIG. 1 of a portion of a tank furnace provided with a depth-control register according to the invention;

FIG. 3 is a perspective view of one element of the register of FIG. 2; and

FIG. 4 is a cross-sectional view taken along line IV—IV of FIG. 2.

In FIG. 1 I show a tank furnace 1 having a floor 16 and an arched roof 13 which is provided with ports 17 (shown in broken lines) adapted to admit furnace gases to the furnace chamber. Since only the portion of the tank furnace between the hot point 11 nad the inlet to the feeding channel 24', which supplies the drawing chamber 25', is of interest in connection with the present invention, the conventional fusion portion of the furnace has been omitted. Between the terminal wall 12, which extends transversely to the supply current of liquid glass (denoted by the arrow 22) along the upper portion of the bath 10 thereof, and the hot point 11 of the glass furnace 1 I dispose a heat-insulating coating 15 beneath the conventional furnace floor 16 to reduce the heat losses in this region from the return current 27 of liquid glass deflected from the supply current 22 and following the floor of the furnace. This return current originally flows downwardly from the supply current 22 along the vertical wall 12 as indicated by the arrow 26 and, upon reaching the region of the hot point 11, flows upwardly as shown by arrow 28.

The upper edge 20' of wall 12 is formed as a sill over which the liquid glass enters the drawing chamber 25' via the feeding channel 24' (indicated by the arrow 23') and is about 30 cm. below the surface of the bath 10 when the latter is approximately 150 cm. deep. The depth of the stream 23' supplied to the feeding channel 24' may be adjustably varied by means of a register, diagrammatically shown at 21' in FIG. 1 and described with greater detail with reference to FIGS. 2-4, which acts in a transverse section of the stream. The distance between the hot point 11 and the transverse terminal wall 12 of the furnace 1 is, as mentioned above, less than 15 meters.

In accordance with the process of my invention, I increase the rate of production and optimize the supply-current velocity by cooling the descending current 26 of glass, thereby increasing the velocity of the return current 27, 28. This may be accomplished by means of a cooling fluid (e.g. air) emitted from a plurality of pipes 19 against the external surface 18 of the terminal wall 12. For the purpose of most satisfactory heat transfer, I have found, the thickness of this wall should not exceed 15 cm.

The depth-control register 21', schematically illustrated in FIG. 1 and serving to regulate the depth of the liquid-glass current 23' entering the feeding channel 24' and the drawing chamber 25' (both of known type and, therefore, indicated merely in dot-dash lines), is shown in structural detail in FIGS. 2-4. The vertically displaceable register 21 consists of a plurality of individual rectangular blocks 29 which are suspended contiguously across the breadth of the sill leading to the feeding channel 24 at the inlet thereto from the tank furnace 1. Each block 29 is formed with a rounded upper portion 38 to which a suspension rod 30 is secured by means of the clamping plates 39. The latter are removably fastened to the blocks 29 with the aid of screws 39'. The suspension rods 30 of the transversely aligned blocks 29 pass through individual friction bushings 43 in the web 31 of a channel iron 32 which is supported on a pair of posts 33 straddling the feeding channel 24 and abutting the wall 41 of the furnace 1. The roof of the channel is composed of refractory bricks 35 and is provided with a transverse slot 42 which acts as a guide for the register blocks 29. The refractory side slabs 36 and 37 of the channel 24 rest upon the floor 20 thereof which is, advantageously, formed as an extension of the sill above the cooled terminal wall 12.

Each of the blocks 29 may be raised and lowered manually or with the aid of well-known automatic devices to provide a regulation in the depth of the current 23 fed via the feeding channel to the drawing chamber throughout its width. I am thus able to compensate for variations in the thickness of the resulting glass sheet. It will be noted that floor 20, also made of refractory material, is considerably heavier than the wall 12 which, as shown, consists of thermally conductive material. By way of example, the use of the aforedescribed register has eliminated local thickness variations in excess of 2 mm. in a finished glass sheet 5 mm. thick and 300 cm. in width produced by the Libbey-Owens method of drawing. The finished sheet has a thickness variation of less than 0.2 mm. between areas of greatest and smallest thickness.

I prefer to form the register blocks 29 from heat-resistant material which is, at most, only weakly attacked by the liquid glass at the temperature prevalent in the feeding channel (e.g. about 1200° C.). Suitable blocks may be made of corundum, mullite and zirconia, or some other refractory silicate. These heat-resistant materials are able to withstand temperatures in excess of 1200° C. while vitreous silica, which also makes suitable bases, is satisfactory for temperatures between 1000° and 1200° C.

The invention illustrated and described is believed to admit of many modifications and variations which are intended to be included within the spirit and scope thereof as defined in the appended claims.

I claim:

1. In an apparatus for making sheet glass, in combination, a furnace provided with a tank having a terminal wall and a bottom, said tank being adapted to contain a vitreous melt and defining an inner high-temperature zone at a refining portion of said furnace and an outer low-temperature zone at said terminal wall, thereby producing an unimpeded convection current of glass having a first branch traversing an upper portion of said melt from said high-temperature zone to said low-temperature zone, a second branch descending along said wall to said bottom, a third branch traversing a lower portion of said melt along said bottom between said low-temperature zone and said high-temperature zone, and a fourth branch ascending from said bottom at said refining portion of said furnace, said terminal wall being formed with an outlet defined by a horizontal sill disposed at such limited depth below the level of said melt as to permit at least part of the glass constituting said first branch of said convection current to flow from said tank while blocking a return flow to said tank; refractory means forming a horizontal channel aligned with said outlet and extending perpendicularly outwardly from said wall for conducting said part of said glass, said channel having a floor of substantially lower thermal conductivity than said wall, and cooling means below said floor for lowering the temperature of said wall by directing a stream of cooling fluid thereagainst, thereby increasing the velocity of glass flowing from said furnace through said outlet.

2. In an apparatus for making sheet glass, in combination, a furnace provided with a tank having a terminal wall and a bottom, said tank being adapted to contain a vitreous melt having a depth on the order of 150 cm. and defining an inner high-temperature zone at a refining portion of said furnace and an outer low-temperature zone at said terminal wall, thereby producing an unimpeded convection current of glass having a first branch traversing an upper portion of said melt from said high-temperature zone to said low-temperature zone, a second branch descending along said wall to said bottom, a third branch traversing a lower portion of said melt along said bottom between said low-temperature zone and said high-temperature zone, and a fourth branch ascending from said bottom at said refining portion of said furnace, said terminal wall being spaced from said high-temperature zone by a distance less than substantially 15 meters and being formed with an outlet having a lower edge defined by a horizontal sill disposed about 30 cm. below the level of said melt for permitting at least part of the glass constituting said first branch of said convection current to flow from said tank while blocking a return flow to said tank; refractory means forming a horizontal channel aligned with said outlet and extending perpendicularly outwardly from said wall for conducting said part of said glass, said channel having a floor of substantially lower thermal conductivity than said wall, and cooling means below said floor for lowering the temperature of said wall by directing a stream of cooling fluid thereagainst, thereby increasing the velocity of glass flowing from said furnace through said outlet.

3. In an apparatus for making sheet glass, in combination, a furnace provided with a tank having a terminal wall with an exposed outer surface having a thickness of less about 15 cm. and a bottom, said tank being adapted to contain a vitreous melt having a depth on the order of 150 cm. and defining an inner high-temperature zone at a refining portion of said furnace and an outer low-temperature zone at said terminal wall, thereby producing an unimpeded convection current of glass having a first branch traversing an upper portion of said melt from said high-temperature zone to said low-temperature zone, a second branch descending along said wall to said bottom, a third branch traversing a lower portion of said melt along said bottom between said low-temperature zone and said high-temperature zone, and a fourth branch ascending from said bottom at said refining portion of said furnace, said terminal wall being spaced from said high-temperature zone by a distance less than substantially 15 meters and being formed with an outlet having a lower edge defined by a horizontal sill disposed about 30 cm. below the level of said melt for permitting at least part of the glass constituting said first branch of said convection current to flow from said tank while blocking a return flow to said tank; refractory means forming a horizontal channel aligned with said outlet and extending perpendicularly outwardly from said wall for conducting said part of said glass, said channel having a floor of substantially lower thermal conductivity than said wall, and substantially horizontal nozzle means below said floor for directing a stream of cooling fluid against said surface to lower the temperature of said wall and, thereby, increasing the velocity of glass flowing from said furnace through said outlet.

References Cited by the Examiner

UNITED STATES PATENTS

| | | | |
|---|---|---|---|
| 1,554,268 | 9/25 | Ferngren | 65—346 X |
| 1,685,546 | 9/28 | Lee | 22—212 |
| 1,879,718 | 9/32 | Soubier | 65—326 |
| 2,077,705 | 4/37 | McKelvey et al. | 65—137 |
| 2,098,440 | 11/37 | Tassick | 65—345 |
| 2,119,949 | 6/39 | Blau et al. | 65—347 X |
| 2,199,355 | 4/40 | Underwood | 65—355 X |
| 2,203,269 | 6/40 | Mulholland | 65—347 X |
| 2,387,886 | 10/45 | Devol | 65—25 |

FOREIGN PATENTS 22,736  7/83  Germany.

DONALL H. SYLVESTER, *Primary Examiner.*
ARTHUR P. KENT, *Examiner.*